US010887387B2

(12) United States Patent
Adams

(10) Patent No.: US 10,887,387 B2
(45) Date of Patent: Jan. 5, 2021

(54) DIGITAL MEDIA SYNCHRONIZATION SYSTEM AND METHOD

(71) Applicant: Barrett Adams, Nine Mile Falls, WA (US)

(72) Inventor: Barrett Adams, Nine Mile Falls, WA (US)

( * ) Notice: Subject to any disclaimer, the term of this patent is extended or adjusted under 35 U.S.C. 154(b) by 82 days.

(21) Appl. No.: 16/241,276

(22) Filed: Jan. 7, 2019

(65) Prior Publication Data

US 2020/0007621 A1 Jan. 2, 2020

Related U.S. Application Data

(60) Provisional application No. 62/614,285, filed on Jan. 5, 2018.

(51) Int. Cl.
| | |
|---|---|
| *H04L 29/08* | (2006.01) |
| *H04L 29/06* | (2006.01) |
| *H04W 8/22* | (2009.01) |
| *G06F 21/10* | (2013.01) |
| *G06F 21/62* | (2013.01) |
| *H04W 84/18* | (2009.01) |
| *H04W 84/12* | (2009.01) |

(52) U.S. Cl.
CPC .......... *H04L 67/1095* (2013.01); *G06F 21/10* (2013.01); *G06F 21/6218* (2013.01); *H04L 65/60* (2013.01); *H04W 8/22* (2013.01); *G06F 2221/0713* (2013.01); *H04W 84/12* (2013.01); *H04W 84/18* (2013.01)

(58) Field of Classification Search
CPC ................. G06F 21/10; G06F 21/6218; G06F 2221/0713; H04L 65/4084; H04L 65/60; H04L 67/1095; H04W 84/12; H04W 84/18; H04W 8/22
See application file for complete search history.

(56) References Cited

U.S. PATENT DOCUMENTS

| | | | |
|---|---|---|---|
| 5,991,374 A * | 11/1999 | Hazenfield | H04H 60/06 379/101.01 |
| 7,996,482 B1 * | 8/2011 | Evans | H04N 21/2387 709/212 |
| 2005/0265316 A1 * | 12/2005 | Liu | H04L 29/06027 370/352 |

(Continued)

*Primary Examiner* — Alina A Boutah
(74) *Attorney, Agent, or Firm* — Gary L. Eastman, Esq.; Eastman, McCartney Dallmann LLP

(57) ABSTRACT

Disclosed is a system and application for digital media that allows users to share a media playlist and synchronize playing for all connected users. The user browses their device for media files to create a playlist, and then hosts the playlist over an existing local area network or creates a Wi-Fi hotspot. The playlist may be encrypted to provide a form of digital rights management. Other users are then prompted to download the playlist and send the host a calculated playback delay. Once all users have completed downloading the playlist the hosting user is prompted to press play, pushing timing information that takes into account the largest delay to all connected users via the active local area network, resulting in all devices playing the media in synchronicity for the duration of the playlist. Additional users may opt in during playback and use the timing information to synchronize their devices' playback.

10 Claims, 9 Drawing Sheets

(56) References Cited

U.S. PATENT DOCUMENTS

| | | | |
|---|---|---|---|
| 2006/0008256 A1* | 1/2006 | Khedouri | G06F 16/4387 386/234 |
| 2006/0015637 A1* | 1/2006 | Chung | H04L 69/14 709/232 |
| 2006/0195479 A1* | 8/2006 | Spiegelman | H04N 21/4825 |
| 2006/0232449 A1* | 10/2006 | Jain | H04N 21/4627 341/50 |
| 2009/0282102 A1* | 11/2009 | Geurts | G06F 21/10 709/204 |
| 2010/0094934 A1* | 4/2010 | Svendsen | H04L 29/08729 709/204 |
| 2010/0162324 A1* | 6/2010 | Mehta | H04N 21/4788 725/61 |
| 2012/0088477 A1* | 4/2012 | Cassidy | G11B 27/11 455/414.1 |
| 2012/0117620 A1* | 5/2012 | Cassidy | H04L 67/306 726/3 |
| 2014/0359470 A1* | 12/2014 | Lin | H04N 21/00 715/745 |
| 2015/0271232 A1* | 9/2015 | Luby | H04L 67/02 709/231 |
| 2016/0234345 A1* | 8/2016 | Roberts, Jr. | H04L 67/306 |
| 2017/0124664 A1* | 5/2017 | Savenok | H04L 63/10 |
| 2017/0251040 A1 | 8/2017 | Archambault et al. | |
| 2017/0273044 A1* | 9/2017 | Alsina | H04N 21/439 |
| 2017/0273067 A1* | 9/2017 | Alsina | H04W 4/021 |
| 2018/0352014 A1* | 12/2018 | Alsina | H04N 21/4532 |

\* cited by examiner

| | Function | Layer | Data Unit |
|---|---|---|---|
| 24 | Establish protocol for communication between applications | Application | Data |
| 22 | Translate data between format used for transmission and format used by application | Presentation | |
| 20 | Manage sequence of messages passed between two endpoints | Session | |
| 18 | Break down (as necessary) and transmit data between endpoints | Transport | Segment / Datagram |
| 16 | Route packets across nodes | Network | Packet |
| 14 | Transmission of data groups ("frames") between nodes | Data Link | Frame |
| 12 | Data transmission over physical medium | Physical | Bit |

Fig. 1 (Prior Art)

DIGITAL MEDIA SYNCHRONIZATION SYSTEM AND METHOD

FIELD OF THE INVENTION

The present invention pertains generally to client and server computing devices configured to share timing information over a local network. More particularly, the present invention pertains to a system of electronic devices implementing an application layer protocol configured to operate over operator-selected physical and network layer protocols for the creation and hosting of media playlists and timing information. The Present invention is particularly, but not exclusively, useful as for use in synchronization of playback on devices across a local network.

BACKGROUND OF THE INVENTION

Computing devices are ubiquitous in modern life, including portable computing devices such as portable media players and mobile phones. Many modern computing devices are capable not only of media playback, but also of connecting to a network such as the internet. When connected to the internet, many modern computing devices, including portable computing devices, are further capable of downloading and streaming media content from internet sources.

Accessing a streaming Internet source allows for the almost-live playback of media content. However, due to the different connection speeds, bandwidths, bottlenecks, and other sources of delay in transmitting data from a streaming source to an end-user computing device, the streamed media is never played back at exactly the same time on different devices. Current streaming protocols and applications do not guarantee synchronized playback across end-user devices. Downloaded content is even less likely to be played back at the same time across devices.

Moreover, the convenient acquisition of media content for playback on end-user devices generally requires an internet connection, particularly when the media is to be shared from a source device to a collection of user devices.

In light of the above, it would be advantageous to provide means for providing synchronized playback of media between end-user devices. It would be further advantageous to provide network means for synchronized playback of shared media between end-user devices without the necessity of internet access.

SUMMARY OF THE INVENTION

Disclosed is a network of two or more computing devices configured to communicate using an application layer protocol designed to cause the devices to play a sequence of media files in order such that the media is played at the exact same time on each device. One of the computing devices is configured to act as a host device, while the remaining are configured to act as user devices.

The physical medium over which data is transmitted varies between embodiments, with preferred embodiments supporting both wired and wireless networks, including Wi-Fi and Bluetooth based wireless networks. Some embodiments further support mixed networks wherein portions of the network are wired and other portions are wireless.

In preferred embodiments the host device and user devices are configured to operate over a user-selected network layer. One user option causes the devices to operate over a pre-existing network layer such as a local area network ("LAN") or wireless local area network ("WLAN"). Another user option causes the devices to operate over a network layer in which the host device acts as the access point and router. Another user option causes the devices to operate as a mesh network, in which each device operates as a router for other connected devices. When operating as a mesh network, the devices are capable of using wired and wireless physical layers, including combinations of different physical layers.

The host device has a processor and a non-volatile memory containing instructions that, when executed, cause the processor to perform steps comprising receiving connections from user devices, sending a media playlist to connected user devices, waiting for a ready signal from one or more connected user devices, and sending a time code to all connected user devices, the time code configured to instruct the connected user devices on when to play the media associated with the media playlist.

Each user device also has a processor and a non-volatile memory. The non-volatile memory of each user device contains instructions that, when executed, cause the processor to perform steps comprising initiating a connection to the host device, downloading a media playlist from the host device, sending a ready signal to the host device, receiving a time code from the host device, and playing the media associated with the media playlist according to the timing instructions in the time code.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a diagram of the OSI reference model of a communications system architecture;

DETAILED DESCRIPTION

Figure 2:
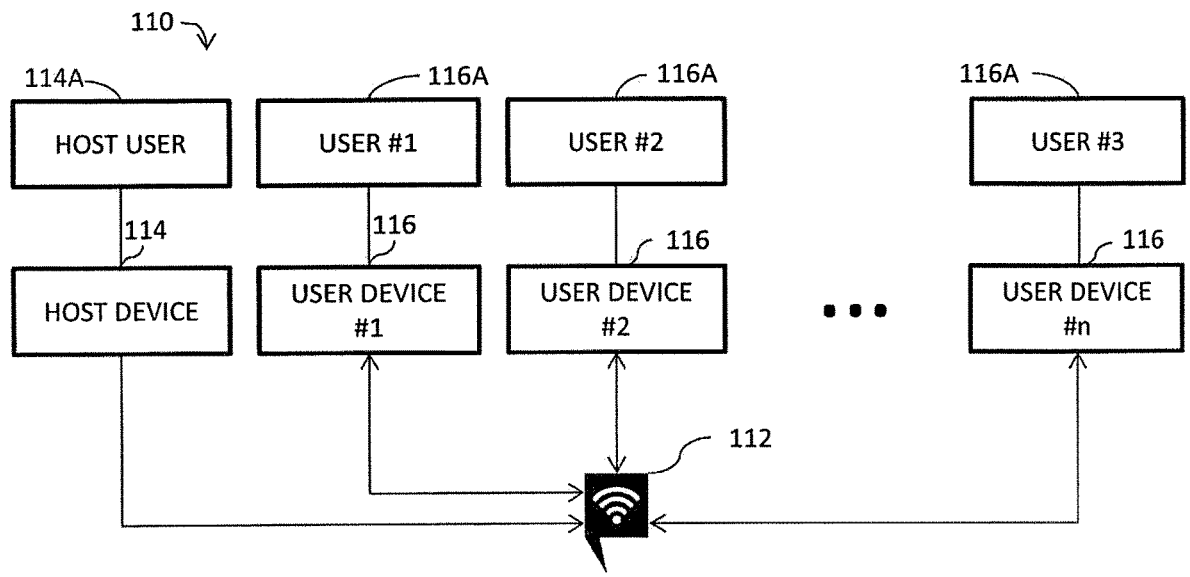
FIG. 2 is a diagram of an embodiment of the present invention in which devices are connected in a local area network using a dedicated routing device.

Referring initially to FIG. 1, the OSI model of network architecture is shown and generally designated 10. The OSI model 10 consists of seven layers, including a physical layer 12, a data link layer 14, a network layer 16, a transport layer 18, a session layer 20, a presentation layer 22, and an application layer 24.

The physical layer 12, data link layer 14, and network layer 16 are generally implemented using hardware adapted to the particular low-level protocols used in the network or the portion of the network in which they are connected. The hardware involved in the physical layer 12 must of necessity be adapted to the physical medium over which the data is being transmitted, which may be electrical signals over copper wire, optical signals over fiber-optic cable, electromagnetic waves transmitted over air, or some other physical medium. Devices such as Ethernet controllers and Wi-Fi or Bluetooth radios operate at the physical layer 12 and also at the data link layer 14, in order to transmit bits and frames of data between nodes on the network. A router implements the network layer 16 in addition to the data link layer 14 and the physical layer 12, as it operates as a node in the network which directs incoming data packets to another node.

The remaining layers are generally implemented in software taking advantage of the services provided by the lower layers. The transport layer 18 is generally implemented using either Transmission Control Protocol ("TCP") or User Datagram Protocol ("UDP"), at least since the popularization of the Internet in the last couple of decades.

The session layer 20, presentation layer 22, and application layer 24 are often referred to together as the "application layer," as is the case in the TCP/IP model. In preferred embodiments of the present invention, the session layer 20 and part of the presentation layer 22 is incorporated into the embodiment using existing software libraries, such as a sockets library for the session layer 20, and a Secure Sockets Layer ("SSL") library or a Transport Layer Security ("TLS") library for encryption services, which are generally classified as a function of the presentation layer 22.

Referring now to FIG. 2, a local area network of devices of a preferred embodiment of the present invention is shown and generally designated 110. Providing transport of data between endpoints of the local area network 110 are one or more routers 112. Network 110 may be a Wi-Fi network in which routers 112 are Wi-Fi routers, a wired LAN in which routers 112 are connected to endpoints and other routers 112 via cables, such as CAT5 cables or fiber optic cables, or a network based on another form of physical, data link, and network layers. An embodiment uses a mixed network, wherein some endpoints connect to a router 112 via cables and others connect wirelessly via Wi-Fi. In the mixed network embodiment, separate routers 112 may be used for wireless and wired connectivity, or some or all routers 112 may have both wired and wireless capabilities. Where more than one router 112 is present, each router 112 must connect to at least one other router 112 in a manner in which each endpoint has a communication path to each other endpoint.

The endpoints of network 110 include a host device 114, usually operated by a host user 114A and one or more user devices 116, usually operated by individual users 116A. The number of user devices 116 is limited only by the physical capacity of the network and the available bandwidth; more particularly, the bandwidth available between host device 114 and the routers 112 must be sufficient so that the host device 114 can push out playlist and timing data to all user devices 116, and there must be sufficient bandwidth available for each user device 116 to receive playlist and timing data from the host device 114. A small network 110, such as one with ten or less user devices 116, may be supported by a single, low-cost router 112. Larger networks 110 with hundreds or thousands of user devices 116 can be supported by using multiple high-end routers 112 and a physical layer capable of supporting high bandwidth (such as 1 Gb or greater between the host device 114 and the router 112 to which the host device 114 is connected).

An alternative embodiment of the present invention uses the internet as the network 110 over which the host device 114 and user devices 116 communicate.

Figure 3:
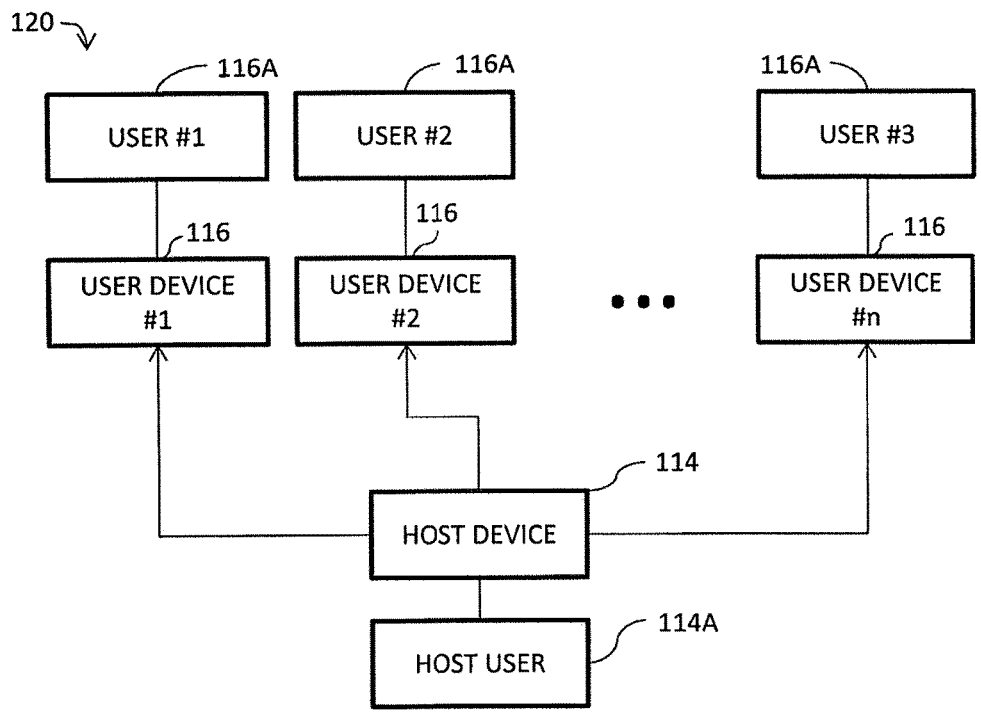
FIG. 3 is a diagram of an embodiment of the present invention in which devices are connected in a local network in which the host user's device also acts as the routing device.

Referring now to FIG. 3, a local network of devices of a preferred embodiment of the present invention is shown and generally designated 120. In network 120, host device 114 acts as a router for the network 120. This allows for the creation of a network 120 and use of the present invention in a location in which dedicated routers are unavailable. When used in conjunction with wireless physical and data link layers, such as WiFi or Bluetooth, network 120 allows the present invention to be used not only in conjunction with mobile devices away from dedicated network infrastructure, but also with moving end points, such as when the host user 114A and/or users 116A are participants in a sporting event or a live performance.

A common configuration for network 120 is one in which the host device 114 acts as an access point and user devices 116 all communicate directly with the host device 114. Such a configuration can be implemented using a protocol such as Wi-Fi direct of a protocol with similar functionality implemented on the host device 114. Although there is no inherent limit to the number of user devices 116 in this network configuration, the specification used may place a limit on the number of user devices 116 (e.g., 802.11 access points have a limit of 2007 devices due to the frame header layout). The host device 114 may also place a numerical limit, either in hardware or in its operating system, to the number of user devices 116 able to connect to it. In any case, experienced network professionals consider about 25 client devices to be a practical upper limit for an access point using the 802.11 specification.

A definite limit to the number of user devices 116 can be avoided by implementing network 120 as an ad-hoc mesh network. A mesh network can be created over Bluetooth, over the 802.11 protocol, or over another protocol supported the host device 114 and the user devices 116, or a combination of the above protocols. In a mesh network, rather than using the host device 114 as a single access point, all the network end points, including the user devices 116, also implement the networking layer and act as routers to direct messages across nodes from source to destination. This allows the network to scale massively—that is, to avoid any hard limit on the number of users—but can create propagation delays and "lag" as the number of user devices 116 grows. The result may be a delay in starting playback of media as the playlist and timing signals propagate to all the user devices 116. Nonetheless, mesh networking appears to provide sufficient performance for networks 120 of at least dozens of user devices 116, and may perform well for even larger networks as technology continues to improve. Propagation delays and lag are mitigated to some extent in some embodiments which allow some or all user devices 116, at the discretion of the host user 114A, to act as caches for the host device 114 to other user devices 116, forming a sort of content delivery network ("CDN") to take a substantial portion of the load off of the host device 114. Such embodiments allow for the creation of larger local networks—regardless of the type of network—with less lag and less required bandwidth between the host device 114 and other devices, both user devices 116 and, if present, routers 112, since nearby devices provide the necessary data, eliminating the need for messages to be transmitted all the way to the host device 114. An embodiment uses a Bittorrent-like protocol which allows user devices 116 to provide already-downloaded content to other user devices 116. Some mesh networking protocols, such as Bluetooth mesh, may actually implement a fixed limit to the number of nodes, although such a limit is likely to be higher than a limit placed on direct connections to an individual mobile device. The Bluetooth mesh specification, for example, has only 32,767 unicast addresses, requiring the number of nodes to be at or under 32,767.

Figure 4:
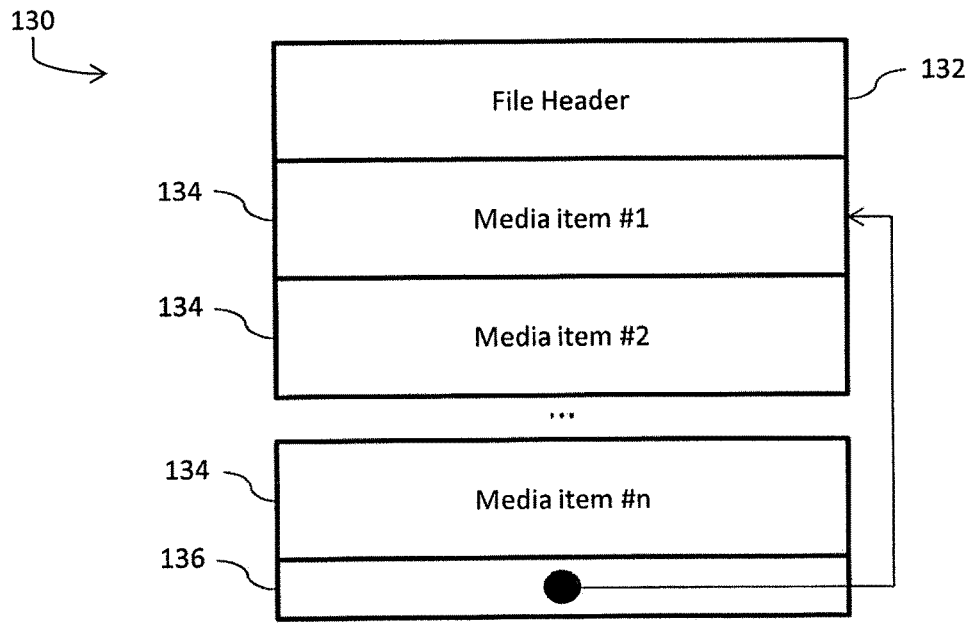
FIG. 4 is a diagram of the layout of a playlist of a preferred embodiment of the present invention.

Referring now to FIG. 4, a playlist of a preferred embodiment of the media playlist of the present invention is shown and generally designated 130. Some embodiments of playlist 130 contain a file header 132, which identifies the file as a playlist file and can also include version information and an optional title. The header 132 also includes instructions on whether the media content can be saved as individual files on the user device 116, whether the media content can be reshared, which portions of the media content may be reshared, whether playback of the playlist is limited to a predetermined number of times, the number of times playlist may be played back, whether the playlist 130 should be deleted after it is played, whether the media content may be shuffled, and an identification of content that may not be shuffled. The identification of content that may not be shuffled is useful if it is desired to play back a certain class of content, such as advertisements, after predetermined numbers of other classes of media items. Additional playback information is also present in the header 132, as discussed below in connection with FIG. 6. The body of the playlist 130 contains a sequence of media items 134 which are intended to be played in the order presented, unless flags permitting shuffling are present in the header 132 as discussed above. The playlist 130 optionally concludes with a reference 136 to an earlier media item 134, such as the first media item, instructing an application reading the playlist 130 to loop back to that point in the playlist. When reference 136 is present, the playlist 130 is a circular playlist, which causes the application reading the playlist to repeat a sequence of media items 134 indefinitely, until the user stops playback of the media items 134. A repeat flag may also be present in the header 132 indicating whether to repeat playback of the playlist 130.

Media items 134 represent media or multimedia content, such as songs or videos. In an embodiment of the present invention, the media items 134 of the playlist 130 are references to media content stored in separate files on the user device 116. The user 116A is expected to have all of the content referenced by media items 134 on his or her device 116; if a media item 134 references content not present on the user device 116, an error condition is raised.

In another embodiment, the media items 134 of the playlist 130 are references to media content stored on a media source, which is accessed either through the host device 114, or through a separate server, depending on the particular configuration arranged by the host user 114A. A playlist 130 is permitted to include some media items 134 that reference content accessed through the host device 114 and other media items 134 that reference content accessed through a separate server. In this embodiment, once an application running on a user device 116 downloads the playlist 130 from the host device 114, the application is expected to download each of the media items 134.

In a preferred embodiment, the media items 134 of the playlist 130 contain the media content that they represent. This embodiment has the advantage that the user device 116 only needs to request a single item from the host device 114, but the downside is a larger response size from the host device 114. As mentioned above, an embodiment uses a bittorrent-like protocol, which allows the user device 116 to download portions of the playlist, including media content, from one or more nearby user devices 116, virtually eliminating issues with downloading a large file from the host device 114.

When the media content is present in the playlist file or accessed through the host device 114 or a separate server, it is possible to use a proprietary media file format in order to provide the user with media content protected by Digital Rights Management ("DRM") technology. By using DRM-protected content, preferred embodiments of the present invention can prevent a user 116A from playing the media content outside of an authorized application and/or outside of the time specified by the host device 114. This may enable the host user 114A to secure favorable licensing terms to use copyrighted media content and allow the host user to provide content to the users 116A that might otherwise be unavailable under copyright law. As mentioned above, a playlist 130 may incorporate a limit in the number of times it may be played back. In some embodiments, this is implemented as a DRM feature. For example, a playlist 130 may be created, incorporating DRM-protected media content, which only allows for playback once, twice, or some other predetermined number of times on a device. In preferred embodiments, once the playlist has been played the predetermined number of times, any user interface elements on the host device 114 that are configured to signal user devices 116 to begin playback are disabled. In some preferred embodiments, the playlist 130 disappears from user devices 116, host device 114, or both after the playlist has been played the predetermined number of times.

Figure 5:
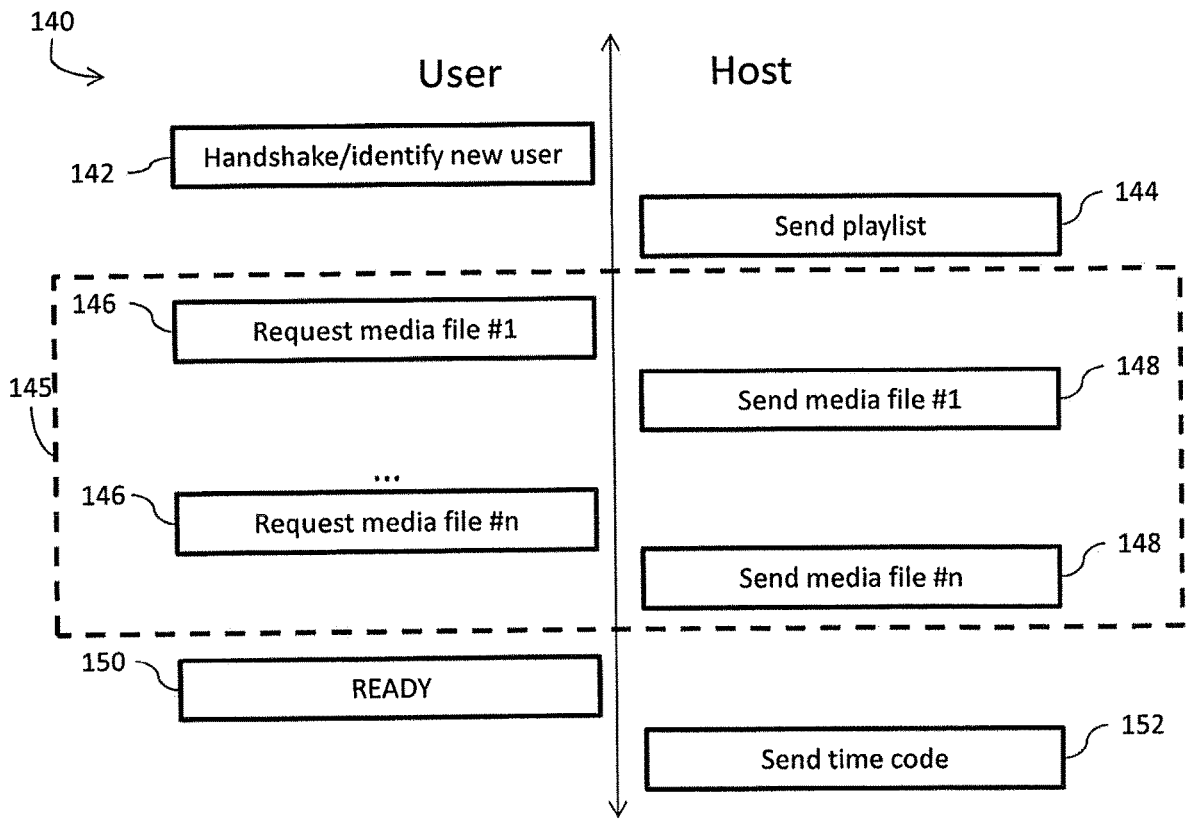
FIG. 5 is a diagram of the application layer protocol of a preferred embodiment of the present invention presented at a general level.

Referring now to FIG. 5, a timeline of messages representing the application layer protocol of a preferred embodiment of the present invention is depicted and generally designated 140. Protocol 140 provides communication rules followed by the host device 114 and an individual user device 116. Each individual user device 116 follows protocol 140 in communicating with the host device 114. As an application layer protocol, protocol 140 is implemented in a host application running on the host device 114 and a client application running on each user device 116. In a preferred embodiment of the present invention, a single application functions as both a host application and a client application, allowing each user 116A to act as a host user 114A when desired, and as a client user 116A at other times. In another embodiment, a separate host application and client application are used, and any user 116A desiring to act as a host user 114A must install a copy of the host application on his or her computing device.

According to protocol 140, once a user device 116 opens a first connection to a host device 114, the user device 116 sends a handshake message 142 identifying itself as a new user. In some embodiments, the handshake message includes user credentials, such as a password, if required by the host device 114. In other embodiments, the handshake message 142 results in one or more responses by the host device 114 requesting credential information, to each of which the user device 116 responds with the requested information. The inclusion of credentials in the handshake message 142 or a subsequent message or messages allows participation in the media transfer and playback to be limited to authorized users 116A. In a preferred embodiment, when the host device 114 is functioning as the access point of an ad-hoc wireless network, the credentials, consisting of a password, are considered to be a password used to access the wireless network, such as a WPA or WPA2 password, and are therefore not sent with the handshake message 142. The host device 114 responds to the handshake message 142 or subsequent authentication with a message 144 that includes a playlist 130. In preferred embodiments, the playlist 130 contains the media content and no further files are sent from the host device 114 to the user device 116.

In alternative embodiments, the media items 134 in the playlist reference content provided by the host device 114, so further file transfers 145 take place. In file transfers 145, the user device 116 sends a request message 146 for each file referenced by the playlist 130 that is provided by the host device 114. To each request message 146, the host device 114 responds with a message 148 containing the requested media file. In an embodiment, a separate connection is opened for each request message 146, through which is sent the response message 148. This allows the user device 116 to send out multiple request messages 146 simultaneously.

In an alternative embodiment, the first connection is used for all messages between the user device 116 and the host device 114, requiring the media file downloads to occur sequentially, but limiting the amount of open connections that the host device 114 must handle at any given time.

In some embodiments, once the user device 116 is identified and authenticated with the host device 114, the user device 116 receives credentials to download the playlist and media from other user devices 116 acting as a CDN, or from other user devices using a bittorrent-like protocol. It will be apparent to one of ordinary skill in the art that a bittorent-like protocol, which splits files into segments (or "pieces") each of which can be provided by either the host device 114 or any device 116 which has already downloaded the piece, would be useful both in embodiments where a single playlist file contains all the media content and in embodiments in which separate media files are downloaded.

Once the user's computing device has downloaded all the media files, or has otherwise determined that it has all of the media content referenced by playlist 130 available, it sends through the first connection a ready message 150 to the host user's computing device indicating that it is ready to play the content when instructed by the host user's computing device. In preferred embodiments in which a single playlist 130 contains all the media content, the ready message 150 is sent after receipt of the playlist 130 and contains a timing offset for the user device 116. Once the host user's device has received one or more ready messages 150 from users' computing devices, the host user may instruct the host user's device to initiate playback. This may happen before a particular user's device has sent a ready message 150. After the user's device has sent a ready message 150 and the host user 114A has instructed the host device 114 to initiate playback, the host user's device uses the first connection to send a time code message 152 containing a time code indicating when playback of the playlist begins. In preferred embodiments, the time code message 152 takes into account the largest timing offset received before preparing and sending the time code message 152.

A benefit of transferring the media content before the time code message 152 is that even a very low bandwidth is sufficient for a result similar to streaming as long as a longer initial preparation time is acceptable. An embodiment of the present invention does allow the host device 114 to stream media to the user devices 116 at the option of the host user 114A. In a streaming setup, the time code 152 is sent when the host user 114A has instructed the host device 114 to initiate playback, even if a user device 116 is still receiving media content. The user device 116 initiates playback according to the time code message 152 using the already downloaded portion of the media content while portions of the media content corresponding to later times are still being downloaded.

Whether or not the media content is downloaded in advance of the time code message 152, the time code message 152 allows for playback to be synchronized between all user devices 116 and the host device 114, providing an advantage over currently available streaming protocols which have deviations in the timing of playback between devices.

Figure 6:
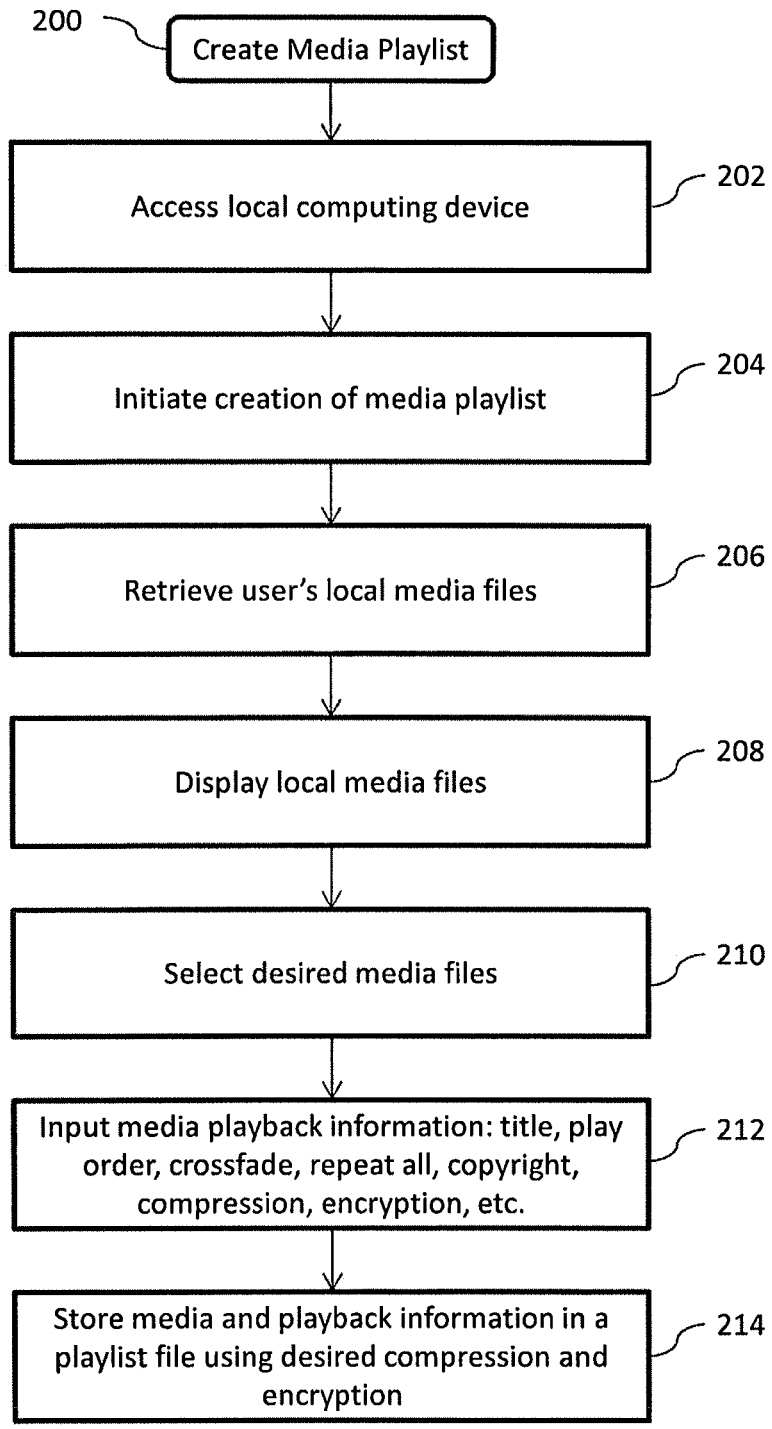
FIG. 6 is a flowchart of a process on a host device for preparing a media playlist containing the media content and playback information.

Referring now to FIG. 6, a process for creating a preferred embodiment of playlist 130 is shown and generally designated 200. Process 200 as depicted results in a playlist 130 containing the media content to be played back on user devices 116 along with playback instructions including play order, crossfade, and whether to repeat playback of the media, along with metadata such as title and copyright information. Nonetheless, it will be apparent to one skilled in the art that process 200 can be adapted for the creation of other types of playlists 130 discussed.

In a first step 202, the host user 114A accesses a computing device such as the host device 114 in order to create a media playlist 130. Step 204 comprises the initiation of creation of a media playlist 130, including opening an application to create the playlist and/or selecting an option in a running application in order to create the playlist. The application performs step 206 of retrieving the user's local media files. In some embodiments, the application performs step 206 in connection with input from the host user 114A, such as the selection by host user 114A of a folder or directory to scan for the presence of media files. The application then performs step 208 of displaying local media files for the host user 114A to select in step 210 to include in the playlist 130. In step 210, the host user 114A selects those files that the host user 114A desires to include in the playlist 130. In step 212, the host user 114A, as prompted by the application, designates the order of playback (if different from the order in which the files were selected), and provides other instructions and information to be included in the playlist 130. Instructions may include instructions on repeating playback of the media in the playlist 130, play order, directions on crossfade between media items. In step 212 the host user 114A may also provide title and copyright information for the playlist 130 and/or the media files to be incorporated therein, as well as select the type of compression to be used for the playlist 130 and its media content. The host user 114A may also indicate in step 212 that encryption of the playlist 130 file is desired. In a preferred embodiment, the playlist file is encrypted with 256-bit AES encryption when the host user 114A indicates that encryption is desired. In an alternative embodiment, the host user 114A is presented with options to select the type of encryption and a desired key length from a set of key lengths supported by the selected encryption type.

Once the host user 114A has selected the desired media files and provided playback information, the application performs step 214 of creating the playlist 130 file. The application stores the playback information and the media content of the selected media files in the playlist 130 file itself. If encryption was requested by the host user 114A in step 212, the playlist 130 file is encrypted in step 214.

Figure 7:
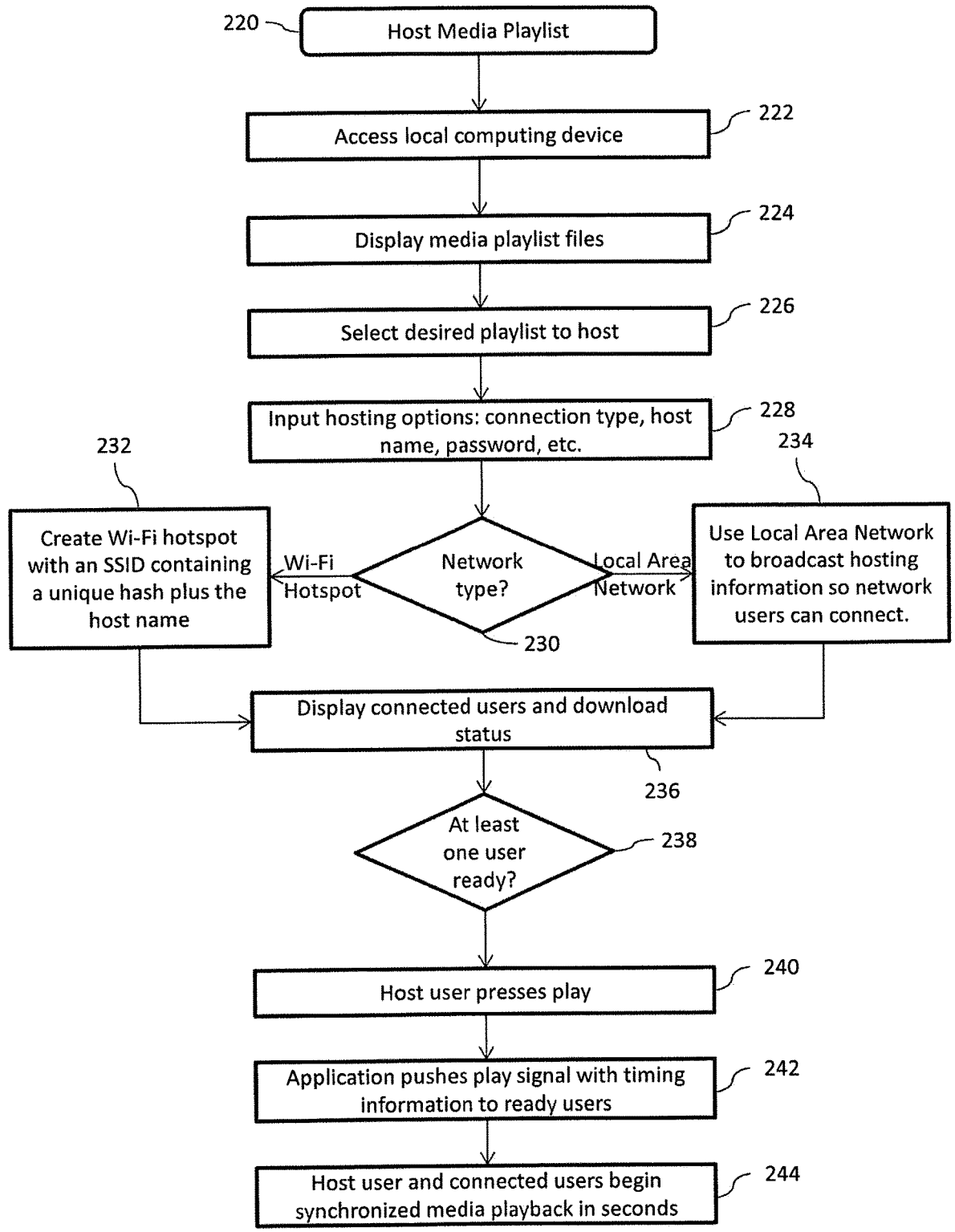
FIG. 7 is a flowchart of a process on a host device for providing a media playlist and timing information to user devices.

Referring now to FIG. 7, a preferred embodiment of the process performed on a host device 114 for providing a playlist 130 and timing instructions to user devices 116 is shown and generally designated 220. In a first step 222, the host user 114A accesses the host device 114 in order to open an application for hosting a playlist 130, and/or select an option from a running application to host a playlist 130. In a preferred embodiment, the same application is used for process 200 and process 220, and a user interface is provided for the host user 114A to select between options for performing process 200 to create a new playlist 130 and process 220 for hosting a playlist for users 216A.

The application performs step 224 in which the media playlists 130 created through process 200 (or a related process for other types of playlist 130) are displayed for the host user 114A to select. In step 226, the host user 114A engages the user interface of the application in order to select a playlist for hosting. In step 228 the host user 114A, in response to prompts by the user interface of the application, provides information needed to host the playlist 130, including a connection type, a host name, and credential information such as a password for access to the playlist 130.

In step 230, the application selects a routine based on the network type selected by the host user 114A. If the host user 114A elected to create a Wi-Fi hotspot—that is, to use the host device 114 as an access point—the application causes the host device 114 to create a wireless network with the host device 114 as the access point. The SSID of the wireless network comprises a unique hash along with the host name provided by the host user 114A. The unique hash comprises at least a sequence of characters identifiable to an application running on a user device 116 as identifying a wireless network as one in which the access point is also a host device 114 following an embodiment of the application-layer protocol of the present invention. It may include a specific sequence of characters, such as "PoYL-" present in the SSID, or a predetermined number of characters followed by a predetermined separator character (such as "-") in which the predetermined number of characters are selected from a predetermined set of allowed characters for the hash. The unique hash may additionally include the user name of the host encoded with a hashing algorithm.

If the host user 114A elected to use a local area network—which can be a wired LAN, a wireless LAN ("WLAN"), or any other existing network—the application performs step 234 of broadcasting hosting information on the local area network so that user devices 116 can recognize the host device 114 and communicate with it using the application-layer protocol of the present invention in order to obtain a playlist 130 and play the related media in synchronization with the host device 114 and other user devices 116.

Alternate embodiments of the present invention allow the use of other types of networks, including networks following the Bluetooth standard, mesh networks, and other networks described above. Depending on the selected network type, the application will perform a step analogous to steps 232 and 234 of creating the network, if necessary, and of identifying itself to user devices 116 on the network as a host device 114 providing a playlist 130.

Once the host device 114 is established as a host device 114 on a new or pre-existing network, the host device performs step 236 of displaying an interface to the host user 114A which shows connected user devices 116 and the playlist 130 and media download status of each connected user device 116. Simultaneously with step 236, the application performs step 238 of waiting until at least one user device 116 has signaled that it is ready, meaning that it has downloaded the playlist 130 including the media content to be played back. In embodiments which stream the media, the user device 116 may signal that it is ready once a sufficient portion of the media content has been downloaded in order to begin playback.

Once a ready message has been received from at least one user device 116, the application prompts the host user 114A to engage a user interface element, such as a button, to instruct the user devices 116 to begin playback. In step 240, the host user 114A engages the user interface element to begin playback. The application then performs step 242 of sending a message containing a play signal and timing information to user devices 116 which have provided the ready message to the host device 114. In response to the play signal, and at the time indicated by the play signal message, the user devices 116 begin playback. If the indicated time has already passed when a user device 116 receives the play signal message, the user device 116 immediately begins playback of the media offset by the difference between the actual time and the indicated playback time, so that the user device 116 is plays the same portion of the media that other user devices 116 are playing. Each ready message will include a real-time local device timing offset, discussed more fully below, which indicates the delay between when a message is sent from the host device 114 and when the particular user device 116 which sent the ready message is able to begin playback of a playlist. In preferred embodiments, the play signal message will comprise a delay of at least the largest real-time local device timing offset received in a ready message before initiating step 242 in the timing information. In an exemplary embodiment, the largest real-time local device timing offset is determined once the host user presses play in step 240. This gives the slowest user device 116 a chance to begin playback at the same time as all other user devices 116.

Figure 8:
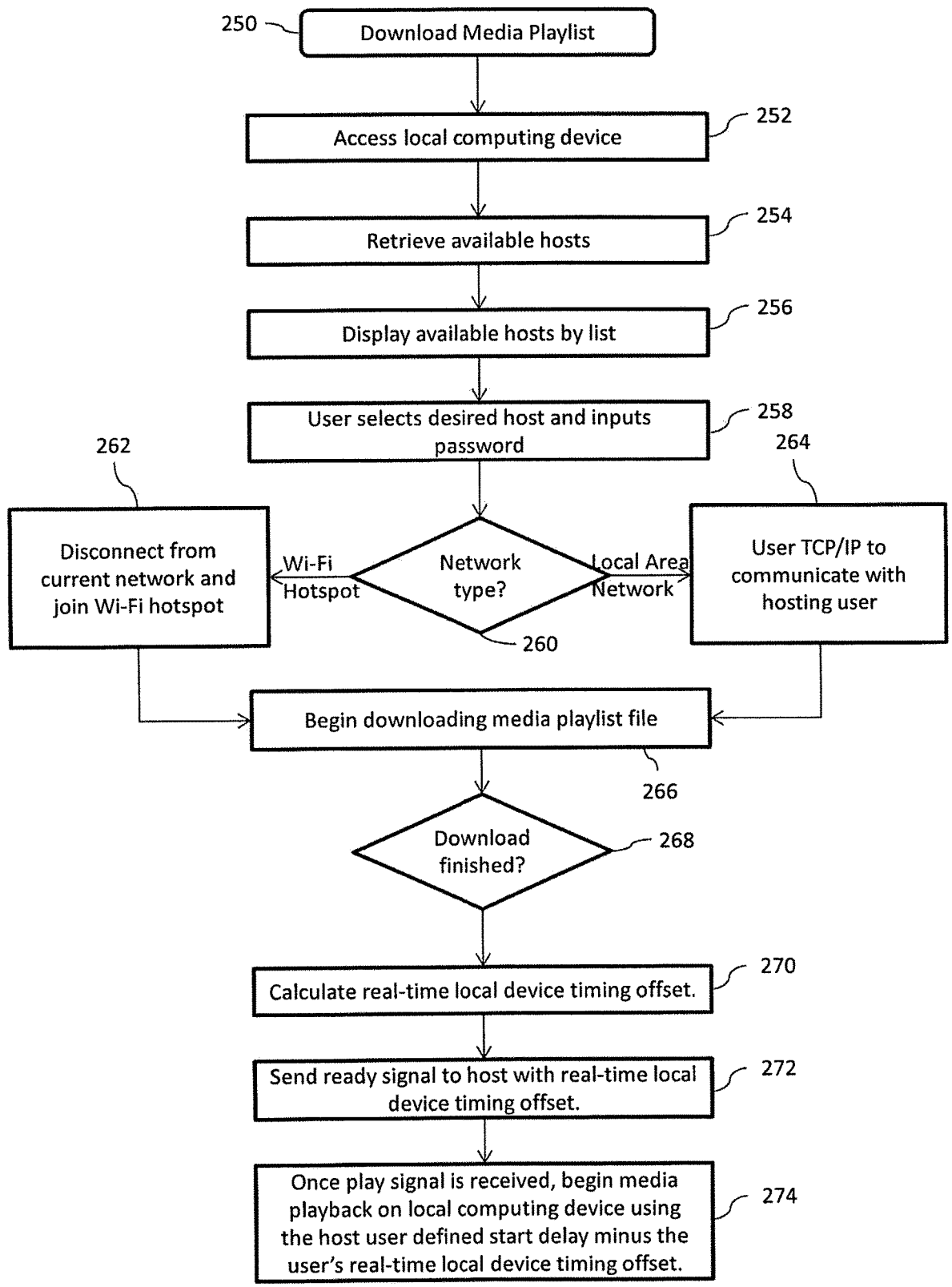
FIG. 8 is a flowchart of a process on a user device for obtaining a media playlist and timing information from a host device.

Referring now to FIG. 8, a preferred embodiment of the process performed by a user device 116 obtaining a playlist 130 and timing instructions from a host device 114 is shown and generally designated 250. A first step 252 is performed by a user 116A, wherein the user 116A accesses a user device 116 to open an application and/or engage a user interface element to run a procedure in a running application in order to select a host device 114 from which to download a playlist 130. The application performs step 254 of retrieving a list of available host devices 114. In a preferred embodiment the retrieval of a list of available host devices 114 comprises listening on the network to which the user device 116 is connected and searching for SSID's with the above-described unique hash used to identify a wireless network as one in which the access point is also a host device 114 following an embodiment of the application-layer protocol of the present invention.

Once a list of available host devices 114 is obtained, the application performs step 256 of displaying a list of available hosts as user interface elements which can be engaged by the user 116A in order to select a host device 114. The user 116A then performs step 258 of selecting a desired host and providing, if required, the necessary credential information such as a password in order to connect to the host device 114 and retrieve its playlist 130. The application performs step 260 of determining the network type, and then performs the step of connecting to the selected host device 114. If the network is a wireless network with the above-discussed unique hash wherein the access point is also a host device 114, the step of connecting to the selected host 114 comprises step 262 of disconnecting from the current network of the user device 116, if any, and connecting to the network provided by the selected host device 114. If the network is a network to which the user device 116 is already connected, the application performs step 264 of connecting to the host device 114 over a predetermined transport-layer protocol onto which the application-layer protocol of the current invention is built. In a preferred embodiment, the predetermined transport-layer protocol is TCP/IP.

Once a connection to the host device 114 is opened, the application follows an embodiment of the application-layer protocol of the present invention, such as an embodiment of the protocol described above in connection with FIG. 5. As part of the protocol, the application performs step 266 of initiating a download of the playlist 130. In preferred embodiments, the application displays a user interface element indicating the download progress while step 268 of performing the download and waiting it to finish is taking place. In a preferred embodiment, the processing of the download takes place on a separate thread from the user interface so that the user device 116 does not appear to freeze. In preferred embodiments, if the playlist 130 is encrypted, the user device 116 receives a decryption key from the host device 114 in order to allow playback of the playlist 130. The user device 116 keeps the decryption key only as long as playback of the playlist 130 is permitted according to rules defined in the header 132 of the playlist 130. Encryption of the playlist 130 allows enforcement of rules regarding playback and saving media, discussed below in connection with FIG. 14, by limiting access to the contents of playlist 130 to processes on the user device 116 that have possession of the decryption key.

Once the download of the playlist 130, including all associated media, is complete, the application performs step 270 of calculating a real-time local device timing offset in order to synchronize playback of the media with all user devices 116. The application performs step 272 of sending a message 150 to the host device 114 with a ready signal 150 indicating that the user device 116 is ready to play the media associated with the playlist 130. Ready signal 150 includes the real-time local device timing offset calculated in step 270. The application then waits for a message 152 from the host device 114 containing instructions to play the media. In preferred embodiments, message 152 comprises a start delay implemented as a number indicating the time delay between the time the message 152 is sent and the time in which playback should begin. Moreover, in preferred embodiments, the start delay in message 152 is at least the largest real-time local device timing offset provided to the host device 114 in a ready signal 150 before the sending of time code 152 was initiated. This allows all user devices 116 that sent a ready signal 150 in advance of the sending of time code 152 to begin playback at the same time and at the beginning of the playlist, since the time code 152 provides a sufficient start delay to account for the largest local timing offset. In at least one embodiment, the start delay is a whole number representing milliseconds. In another embodiment, the start delay is a floating point number representing seconds. It will be apparent to one of skill in the art that the start delay may also be implemented in virtually any number representation and with any unit of time. It is easiest to use a number representation with which arithmetic is hardware-supported rather than one wholly implemented in software because a hardware-supported number representation allows for processing the start delay in both a lower and more predictable amount of time, allowing for easier computation of the local device timing offset discussed below.

Once a message 152 is received, the application then performs step 274 of playing the media associated with the playlist 130 using a timing calculated by subtracting the real-time local device timing offset of the user device 116 subtracted from the host device 114 defined start delay in order to provide playback of the media content synchronized with the other user devices 116.

In some embodiments, the host device 114 optionally follows its own timing instructions and plays back the media associated with the playlist 130 in synchronization with the user devices 116.

Figure 9:
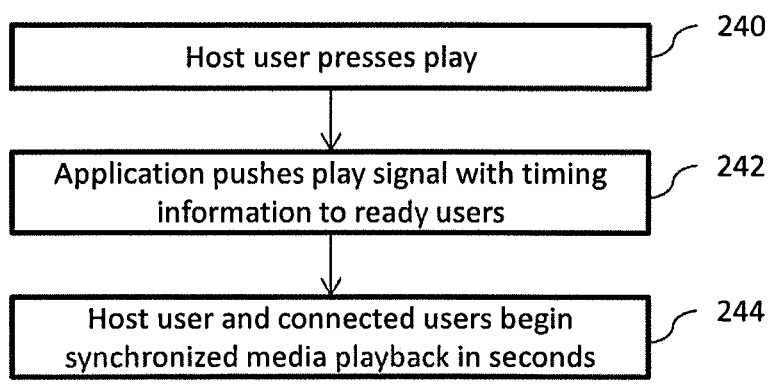
FIG. 9 is a flowchart of a process on a host device for providing timing information to user devices.

Referring now to FIG. 9, an alternative embodiment of the application layer protocol 140 does not include the transfer of playlist or media data. Rather, users 116A are responsible for downloading the media, which may be in the form of a playlist 130 above, to their own user devices 116. In some variants, a checksum or hash (such as an MD5 hash) of the playlist 130 is sent to the host device 114 in order to verify that each user device 116 has the correct (and same) playlist 130. The checksum or hash may be included as part of the ready signal 150. In other variants, no verification of the playlist 130 is performed by the host device 114. In some embodiments, the verification of the playlist 130 is performed or skipped based on a host device 114 setting configurable by the host user 114A.

Once a ready message has been received from at least one user device 116, which in this case occurs right after the handshake 142 and identification, the application prompts the host user 114A to engage a user interface element, such as a button, to instruct the user devices 116 to begin playback. In step 240, the host user 114A engages the user interface element to begin playback. The application then performs step 242 of sending a message containing a play signal and timing information to user devices 116 which have provided the ready message to the host device 114. In response to the play signal, and at the time indicated by the play signal message, the user devices 116 begin playback. If the indicated time has already passed when a user device 116 receives the play signal message, the user device 116 immediately begins playback of the media offset by the difference between the actual time and the indicated playback time, so that the user device 116 is plays the same portion of the media that other user devices 116 are playing. Each ready message will include a real-time local device timing offset, discussed more fully below, which indicates the delay between when a message is sent from the host device 114 and when the particular user device 116 which sent the ready message is able to begin playback of a playlist.

Figure 10:
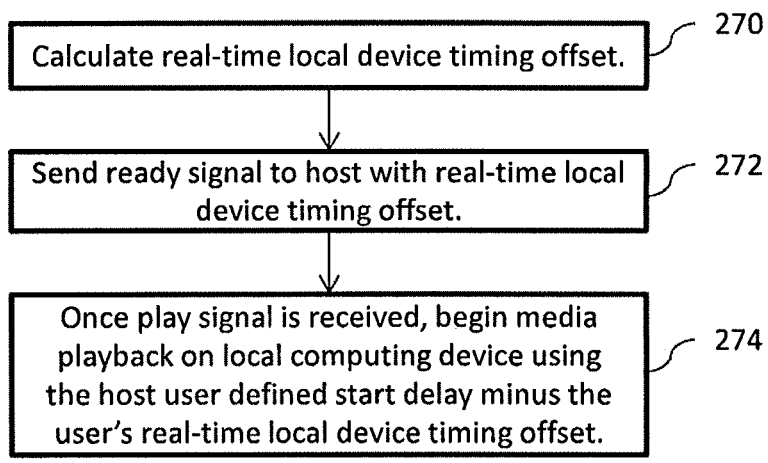
FIG. 10 is a flowchart of a process on a user device for obtaining timing information from a host device.

Referring now to FIG. 10, in the alternative embodiment of the application layer protocol discussed in connection with FIG. 9, each user 116A downloads the media, such as a playlist 130, directly to the user device 116. Thus the step 270 of calculating the real-time local device timing offset is performed without the necessity of downloading a playlist 130 from the host device 114. The application performs step 272 of sending a message 150 to the host device 114 with a ready signal 150 indicating that the user device 116 is ready to play the media associated with the playlist 130. Ready signal 150 includes the real-time local device timing offset calculated in step 270. As mentioned above, ready signal 150 also includes a checksum or hash such as an MD5 sum of the playlist 130 in order to allow the host device 114 to ensure that the user device 116 has the correct playlist. The application then waits for a message 152 from the host device 114 containing instructions to play the media. In preferred embodiments, message 152 comprises a start delay implemented as a number indicating the time delay between the time the message 152 is sent and the time in which playback should begin. Once a message 152 is received, the application then performs step 274 of playing the media associated with the playlist 130 using a timing calculated by subtracting the real-time local device timing offset of the user device 116 subtracted from the host device 114 defined start delay in order to provide playback of the media content synchronized with the other user devices 116.

Figure 11:
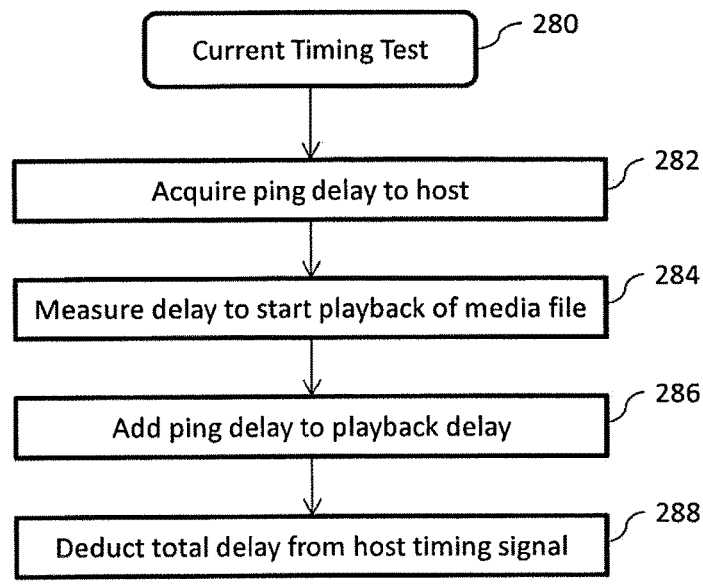
FIG. 11 is a flowchart of a process on a user device for calculating a local timing offset.

Referring now to FIG. 11, a flowchart of a current timing test 280 process for calculating the local timing offset of a user device 116 is shown. The current timing test 280 is performed by application software running on the user device 116, which, in preferred embodiments, is part of the application used by the user 116A to utilize and practice other aspects of the present invention related to the user 116A and user device 116. In a preferred embodiment, the current timing test 280 is performed after downloading the playlist 130, but before sending the ready message 150 to the host device 114. It will be apparent to one of ordinary skill in the art that the current timing test 280 could also be performed at any other time between initially connecting to the host device 114 and initiating playback of the media content.

To perform the current timing test 280, the user device 116 performs an initial step 282 of acquiring a ping delay to the host device 114. In a preferred embodiment, the timing of several ping delays to the host device 114 are averaged in order to ensure an accurate timing. The user device 116 also performs step 284 to measure the delay in beginning playback of a media file. If step 284 is performed after downloading playlist 130, it may be performed through simulating playback of playlist 130 in order to determine the amount of time between beginning the playback routine and the beginning of actual media playback. Otherwise, a simulation may be performed on a test data structure based on the structure of a playlist 130.

In step 286, the ping delay determined in step 282 is added to the delay in beginning playback of a media file determined in step 284 in order to obtain a total delay. The total delay is the local device timing offset of the user device 116. The calculation of the total delay may require also the addition of the time needed to process the time code message 152 from the host device and subtract a number from the start delay in the time code message 152. However, in a preferred embodiment, the time to process time code message 152 and subtract a number from the start delay is calculated as part of the simulated playback of playlist 130 and thus already included in the total delay.

Step 288 is included in FIG. 11 for its relevance to the current timing test 280, although it is performed after receiving the time code message 152 from the host device 114. Once the time code message 152 is received from the host device 114, the start delay is extracted from the time code message 152 and the total delay, or local device timing offset, is subtracted from the start delay in order to determine the actual delay until playback. Playback then begins after the amount of time represented by actual delay. The actual delay may be a negative number, either because the local device timing offset is greater than the start delay, or because the start delay sent by the host device 114 was a negative number. If a user device 116 sends a ready message 150 to the host device 114 after playback has begun on other user devices 116, then the time code message 152 sent back by the host device 114 will be negative. When the actual delay is negative, the user device 116 will begin playback of the media at a point offset by the actual delay. That is, if the actual delay is negative two-thousand (−2000) milliseconds, playback will begin two (2) seconds into the media, so that the playback is synchronized with other user devices 116.

Figures 12, 13:
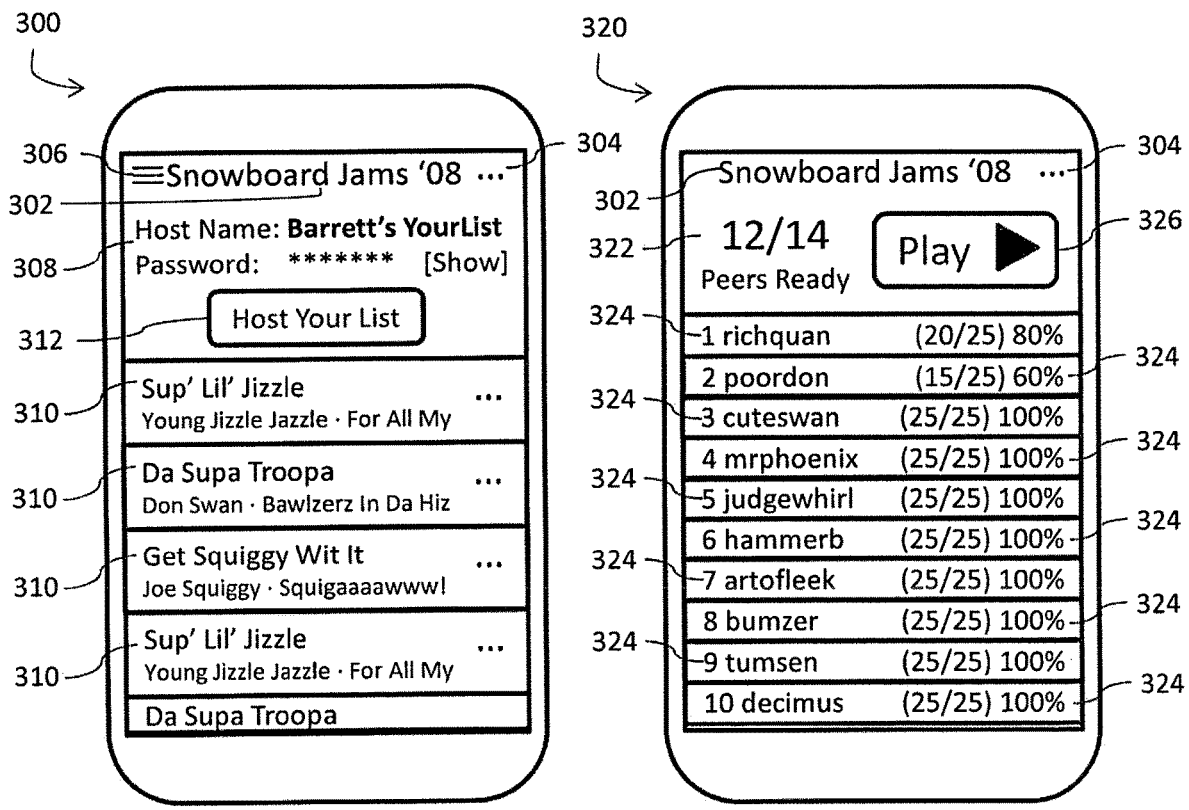
FIG. 12 is an illustration of a user interface for creating and hosting a playlist on a host device.
FIG. 13 is an illustration of a user interface for instructing a host device to send a time code to initiate playback on user devices.

Referring now to FIG. 12, an interface for creation of a playlist 130 for hosting is shown and generally designated 300. At the top of interface 300 a user-entered playlist title 302 is shown. Also present are an application menu 304 and a playlist menu 306. Application menu 304 allows the host user 114A to leave the playlist creation interface 300 and access other portions of the application, such as portions related to a user 116A in embodiments in which the application is configured to allow the device to act as either a host device 114 or a user device 116 at the user's option. Playlist menu 306 includes user-engageable options allowing the user to access interface elements for adding or removing songs from the playlist 130, changing the playlist name, saving the playlist 130 for later use, or configuring the type of network to use. User-editable host information 308 is also displayed in interface 300, allowing the host user 114A to set the host name and the password used by users 116A to connect to the host and download the playlist. User-added media items 310 are shown in a list, and rearrangeable by the user through drag-and-drop style user-interface mechanisms. A button 312 is engageable by the user 114A in order to initiate hosting of the playlist 130.

Referring now to FIG. 13, once hosting of a playlist 130 has been initiated, the host user 114A is presented with a connection and playback interface 320. Interface 320 displays the playlist title 302, the interface element for the application menu 304, peer information 322 including the number of peers and the number of ready peers, and a list of connected peers 324. In a preferred embodiment, each connected peer 324 represented in the list is accompanied by status information, including the number of media items 134 downloaded out of the total number of media items 134 of the playlist 130, and the portion of the media content downloaded represented as a percentage, one-hundred percent (100%) indicating that the peer is ready. A user interface element 326, represented in FIG. 13 as a button, is engageable by the host user 114A after at least one peer is ready, and configured to cause a time code message 152 to be sent to connected peers when engaged. User interface element 326 is disabled, and in some embodiments hidden, until at least one peer is ready. In an alternative embodiment, user interface element 326 is disabled until all connected peers are ready.

Figure 14:
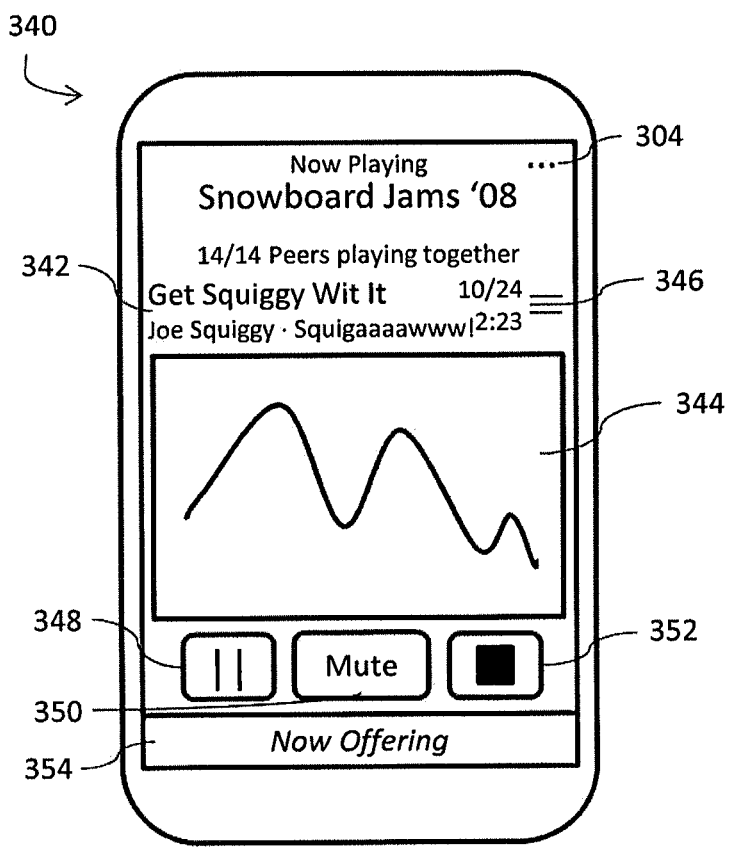
FIG. 14 is an illustration of a user interface showing a currently playing media item.

Referring now to FIG. 14, an interface related to a currently playing media item is shown and generally designated 340. In preferred embodiments of the present invention, interface 340 is shown on both host device 114 and user devices 116 during playback of a playlist 130, and appears substantially similar on the host device 114 and the user devices 116, although individual features are enabled and disabled on the user devices 116 according to directions in the playlist 130. Application menu 304 allows the user to leave the interface, abandoning the playlist 130 in some embodiments. In preferred embodiments, playback of the playlist 130 by a user device 116 continues until explicitly stopped by the user 116A or interrupted by the user 116A connecting to another host device 114 or initiating playback of media in another application.

Also visible in interface 340 is media item 134 information 342, which includes, in preferred embodiments, title and artist information, album information if relevant, the number of the media item 134 in the playlist 130 out of the total number of playlist 130 items, and the elapsed time of during playback of the media item 134. A graphical area 344 includes one or more of album cover art, an animation based on audio output levels, video if the media item 134 comprises video, or other content as appropriate to the media type. When the media item 134 comprises video, it may be played back at full screen, covering interface 340. When full-screen video playback is available, interface 340 is configured to allow a user to toggle between full-screen playback and interface 340; in some embodiments, the toggle operation is performed by tapping or clicking on the graphical area 344 when interface 340 is visible, and tapping or clicking on the video during full-screen playback. In other embodiments, full-screen playback is toggled by placing user device 116 (or host device 114) into a horizontal orientation, and interface 340 is shown when the device is placed back into a vertical orientation. The distinct forms of engaging the toggle operation are not mutually exclusive, and some embodiments support both.

A media item menu 346 provides options related to the current media item 134 and the current playlist 130. When toggled, media item menu 346 displays user interface elements engageable by the user to perform various operations, among which are the display of an interface showing a list of media items 134 in the playlist, an option to save the current media item 134 as a separate file on the user device 116, or to save the entire playlist 130 for future playback. Options to save the entire playlist comprise an option for saving the playlist 130 itself and an option for saving the media items 134 of the playlist as an individual file for each media item 134. Individual options may be disabled based on instructions in the playlist 130. For example, the playlist 130 may include instructions in its header to delete the playlist after initial playback, causing menu options for saving media items and for saving the playlist to be disabled. Alternatively, the playlist 130 may include instructions to allow the saving of certain media items 134 but not others. The playlist 130 may include instructions to allow the playback of the playlist 130 a certain number of times, after which the playlist 130 is automatically deleted from the user device 116. A playlist 130 may also include header information indicating that playlist 130 may be saved, but that specific media items 134 may not be skipped during later playback and that their locations in the playlist 130 must remain unchanged if the playlist 130 is shuffled during later playback. Options for saving the media item 134 and the playlist 130 will be disabled and enabled as necessary to implement the particular instructions in the playlist 130 for the playlist 130 as a whole and for each media item 134. This allows the host user 114A to comply with any relevant license restrictions while distributing the playlist 130.

In some embodiments, a playlist 130 may be re-shared if the header information in playlist 130 allows for re-sharing. When re-sharing is permitted, the menu 346 includes an active option to download the playlist 130. After downloading the playlist 130, the user 116 may share the playlist 130 by loading the playlist 130 into interface 300 (shown in FIG. 12) and providing a host name and password, thereby becoming a host user 114 upon engaging button 312 (shown in FIG. 12).

Additional playback options are provided as engageable user interface elements and displayed as buttons in FIG. 14. Element 348 is engageable by a user to pause playback, and may be disabled on user devices 116 by an instruction in the header of playlist 130 in order to prevent unsynchronized playback. Element 350 is engageable by a user in order to mute playback while continuing progression through the playlist, and element 352 is engageable by a user in order to stop playback. In some embodiments, engaging element 350 during synchronized playback replaces element 350 with a play button, which, when engaged, will resume playback offset by the time elapsed since engagement of element 350 in order to maintain synchronization with other user devices 116. In other embodiments, engaging element 350 during synchronized playback abandons the playlist 130, requiring initiation of a new connection to the host device 114 in order to resume playback.

Preferred embodiments allow the display of an advertisement 354 on interface 340, which may comprise targeted advertising for each individual user 116A.

While there have been shown what are presently considered to be preferred embodiments of the present invention, it will be apparent to those skilled in the art that various changes and modifications can be made herein without departing from the scope and spirit of the invention.

What is claimed is:

1. A system for synchronized media playback, comprising:
    a host device comprising a processor and a non-volatile memory;
    one or more user devices, each user device comprising a processor and a non-volatile memory;
    a network comprising a communications channel between the host device and the one or more user devices; and
    credential means to ensure each of the one or more user devices is authorized to receive media playlist and timing information from the host device,
    wherein the non-volatile memory of the host device contains instructions that when executed by the processor of the host device, cause the host device to transmit a playlist comprising media items over the network to the one or more user devices, wait for a ready signal from at least one of the one or more user devices, and transmit a play signal with timing information to the one or more user devices,
    wherein the non-volatile memory of each of the one or more user devices contains instructions that when executed by the processor of the user device, cause the user device to receive the playlist comprising media items over the network from the host device, send a ready signal to the host device, receive a play signal containing timing information from the host device, and play the media items of the playlist according to the timing information, and
    wherein the timing information transmitted by the host device is configured to cause the one or more user devices to synchronize the timing of playing the media items.

2. The system for synchronized media playback as recited in claim 1, wherein the network is a local network.

3. The system for synchronized media playback as recited in claim 2, wherein the local network is a local area network.

4. The system for synchronized media playback as recited in claim 2, wherein the local network is an ad-hoc wireless network wherein the host device acts as the access point.

5. The system for synchronized media playback as recited in claim 4, wherein the local network comprises an SSID comprising a unique hash configured to identify the local network as a network with a host device as the access point.

6. The system for synchronized media playback as recited in claim 2, wherein the local network is a mesh network.

7. The system for synchronized media playback as recited in claim 1, wherein the playlist further comprises playback information, and wherein the media items comprise media content.

8. The system for synchronized media playback as recited in claim 7, wherein the playlist is compressed.

9. A method for synchronized media playback, comprising:
- providing a host device;
- providing one or more user devices;
- providing a communications channel between the host device and the one or more user devices;
- creating a playlist on the host device, the playlist comprising media items;
- verifying the credentials of the one or more user devices to participate in synchronized media playback;
- transmitting the playlist from the host device to the one or more user devices using the communications channel;
- preparing a time signal on the host device indicating a time to begin playback of the media items of the playlist;
- transmitting the time signal from the host device to the one or more user devices using the communications channel; and
- playing the media items of the playlist according to the time signal, wherein the step of creating a playlist on the host device comprises:
- retrieving a list of media files on the host device;
- displaying the list of media files on the host device in the form of user interface elements operable by a user to add a corresponding media file to a playlist;
- receiving from the user a list of media files to add to the playlist
- displaying user interface elements on the host device operable by the user to define playback information comprising play order, crossfade, repeat, restrictions on playback, and restrictions on saving media from the playlist;
- receiving from the user playback information;
- storing contents of the media files from the list of media files in the playlist as a playlist body;
- storing the playback information in the playlist as a playlist header; and
- encrypting the playlist.

10. The method for synchronized media playback as recited in claim 9, wherein the communications channel between the host device and the one or more user devices comprises an ad-hoc Wi-Fi network created by the host device.

* * * * *